(12) United States Patent
Yokoi

(10) Patent No.: US 12,258,918 B2
(45) Date of Patent: Mar. 25, 2025

(54) ENGINE CONTROL APPARATUS

(71) Applicant: ISUZU MOTORS LIMITED, Yokohama (JP)

(72) Inventor: Takeshi Yokoi, Fujisawa (JP)

(73) Assignee: ISUZU MOTORS LIMITED, Yokohama (JP)

( * ) Notice: Subject to any disclaimer, the term of this patent is extended or adjusted under 35 U.S.C. 154(b) by 0 days.

(21) Appl. No.: 18/586,933

(22) Filed: Feb. 26, 2024

(65) Prior Publication Data

US 2024/0301836 A1    Sep. 12, 2024

(30) Foreign Application Priority Data

Mar. 10, 2023   (JP) .................................. 2023-037288

(51) Int. Cl.
F02D 41/14   (2006.01)

(52) U.S. Cl.
CPC ...... *F02D 41/14* (2013.01); *F02D 2200/0614* (2013.01); *F02D 2200/1004* (2013.01); *F02D 2200/101* (2013.01)

(58) Field of Classification Search
CPC ............. F02D 41/14; F02D 2200/0614; F02D 2200/1004; F02D 2200/101
See application file for complete search history.

(56) References Cited

U.S. PATENT DOCUMENTS

| | | | | |
|---|---|---|---|---|
| 2001/0015065 A1* | 8/2001 | Ide | .......................... | F02B 75/22 60/285 |
| 2002/0050269 A1* | 5/2002 | Osanai | .................. | F02P 5/1508 123/339.11 |
| 2005/0022506 A1* | 2/2005 | Nishizawa | .............. | F02P 17/12 60/276 |
| 2005/0216165 A1* | 9/2005 | Ito | .......................... | F02D 41/16 701/84 |
| 2008/0120013 A1* | 5/2008 | Yamaguchi | ........... | F02D 41/403 701/108 |
| 2008/0147299 A1* | 6/2008 | Haraguchi | .......... | F02D 41/1497 701/103 |

(Continued)

FOREIGN PATENT DOCUMENTS

| | | | | |
|---|---|---|---|---|
| CN | 103935360 A * | 7/2014 | ............ | B60W 10/06 |
| JP | 2011-169245 A | 9/2011 | | |

(Continued)

*Primary Examiner* — Joseph J Dallo
(74) *Attorney, Agent, or Firm* — PROCOPIO, CORY, HARGREAVES & SAVITCH LLP

(57) ABSTRACT

An engine control apparatus has: a first acquiring section that acquires an estimated torque of an engine according to a current rotation speed of the engine, and an instruction value representing an injection amount of a fuel injected to a cylinder of the engine; a second acquiring section that acquires an actual torque according to an amount of generated power generated by an electric power generator coupled to an output shaft of the engine when the amount of the fuel according to the instruction value is injected to the cylinder of the engine; and a correcting section that corrects at least any one of combustion timing at which the fuel is combusted in the cylinder and the instruction value on a basis of a first torque difference between the estimated torque acquired by the first acquiring section and the actual torque acquired by the second acquiring section.

10 Claims, 3 Drawing Sheets

(56) References Cited

U.S. PATENT DOCUMENTS

| | | | | |
|---|---|---|---|---|
| 2012/0203416 A1* | 8/2012 | Yoshimura | .......... | B60L 15/2045 |
| | | | | 903/902 |
| 2013/0160536 A1* | 6/2013 | Majima | ................ | G01M 15/09 |
| | | | | 73/114.11 |
| 2014/0024491 A1* | 1/2014 | Kobayashi | ............ | B60W 20/40 |
| | | | | 180/65.265 |
| 2014/0288802 A1* | 9/2014 | Katayama | ........... | F02D 41/0085 |
| | | | | 701/103 |
| 2018/0283299 A1* | 10/2018 | Kondo | ................ | F02D 41/2467 |
| 2021/0380121 A1* | 12/2021 | Oishi | ..................... | F02D 41/10 |

FOREIGN PATENT DOCUMENTS

| | | | | | |
|---|---|---|---|---|---|
| JP | 2015068334 A | * | 4/2015 | | |
| WO | WO-2011132604 A1 | * | 10/2011 | .......... | F01N 13/009 |
| WO | WO-2016027463 A1 | * | 2/2016 | ............ | B60K 6/485 |
| WO | WO-2018068997 A1 | * | 4/2018 | .......... | F02D 35/023 |

* cited by examiner

ENGINE CONTROL APPARATUS

CROSS-REFERENCE TO RELATED APPLICATIONS

The present application claims priority to Japanese Patent Applications number 2023-37288, filed on Mar. 10, 2023, contents of which are incorporated herein by reference in their entirety.

BACKGROUND OF THE INVENTION

The present disclosure relates to an engine control apparatus that controls an engine. There are known technologies for controlling operating conditions such as the combustion timing of a fuel of an engine or the injection amount of the fuel. Japanese Patent Application Publication No. 2011-169245 discloses a technology in which a command about injection timing and an injection amount according to the type and mixing ratio of a biofuel set by a user at the time of use of the biofuel is given to an engine with reference to a map for calculating correction amounts of operating conditions for the type and mixing ratio of the biofuel.

However, there has been a fear that a fuel in a cylinder is not combusted appropriately if a user makes a mistake in setting information about the fuel such as the type or mixing ratio of the fuel.

BRIEF SUMMARY OF THE INVENTION

Therefore, the present disclosure has been made in view of these matters, and an object thereof is to appropriately set operating conditions of an engine that can be refueled with various types of fuel.

A first aspect of the present disclosure provides an engine control apparatus having: a first acquiring section that acquires an estimated torque of an engine according to a rotation speed of the engine, and an instruction value representing an injection amount of a fuel injected to a cylinder of the engine; a second acquiring section that acquires an actual torque according to an amount of generated power generated by an electric power generator coupled to an output shaft of the engine when the amount of the fuel according to the instruction value is injected to the cylinder of the engine; and a correcting section that corrects combustion timing at which the fuel is combusted in the cylinder on a basis of a first torque difference between the estimated torque and the actual torque.

A second aspect of the present disclosure provides an engine control apparatus having: a first acquiring section that acquires an estimated torque of an engine according to a rotation speed of the engine, and an instruction value representing an injection amount of a fuel injected to a cylinder of the engine; a second acquiring section that acquires an actual torque according to an amount of generated power generated by an electric power generator coupled to an output shaft of the engine when the amount of the fuel according to the instruction value is injected to the cylinder of the engine; and a correcting section that corrects the instruction value on a basis of a first torque difference between the estimated torque and the actual torque.

DETAILED DESCRIPTION OF THE INVENTION

Hereinafter, the present disclosure will be described through exemplary embodiments, but the following exemplary embodiments do not limit the invention according to the claims, and not all of the combinations of features described in the exemplary embodiments are necessarily essential to the solution means of the invention.

Configuration of Engine Control Apparatus 1

Figure 1:
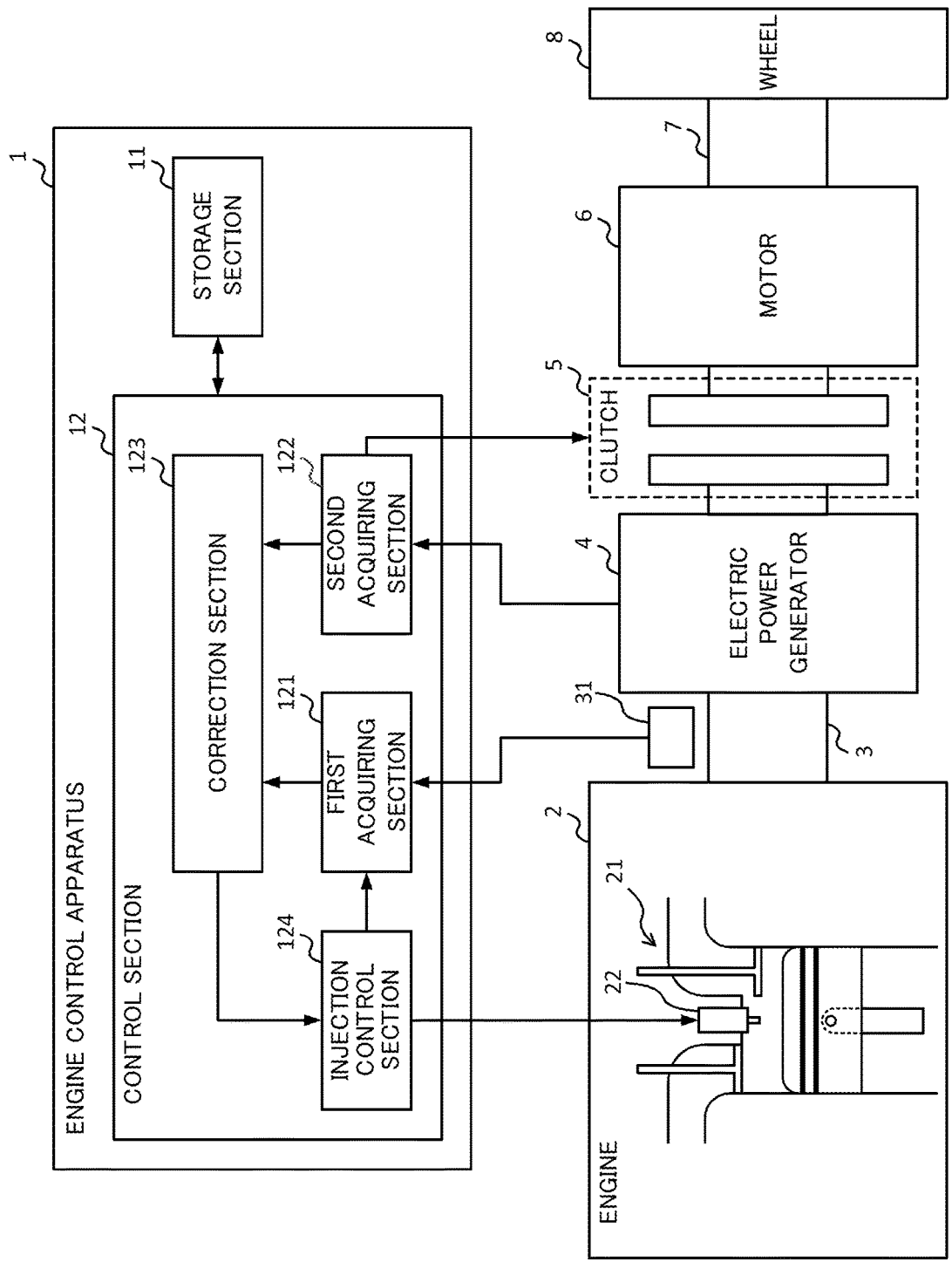
FIG. 1 is a figure for explaining the configuration of an engine control apparatus.

FIG. 1 is a figure for explaining the configuration of an engine control apparatus 1. The engine control apparatus 1 controls an engine 2 mounted on a vehicle V. In addition to the engine 2, the vehicle V has an electric power generator 4 and a motor 6 mounted thereon. The electric power generator 4 is coupled to an output shaft 3 of the engine 2. When the output shaft 3 rotates, the electric power generator 4 generates an amount of electric power according to a torque output by the engine 2. The electric power generator 4 is connected with and disconnected from the motor 6 by a clutch 5. A rotation shaft 7 of the motor 6 is connected to wheels 8 of the vehicle V.

Meanwhile, while the engine 2 is stopped, the engine 2 is refueled with a type of fuel different from a type of fuel that had been stored immediately before the engine 2 was stopped, in some cases. In a case where the engine 2 is refueled with a different type of fuel, the amount of heat or combustion speed at the time of fuel combustion changes. The amount or injection timing of a fuel to be injected to the combustion chamber of the engine 2 is decided in accordance with the amount of heat or combustion speed of the fuel. Accordingly, in a case where the engine 2 is refueled with a different type of fuel, there is a fear that, if the amount or combustion timing of the fuel is made the same as the amount or combustion timing of the fuel decided before the refueling, the fuel injected to the combustion chamber is not combusted appropriately. In view of this, the engine control apparatus 1 corrects operating conditions of the engine 2 in a case where the engine 2 is refueled. For example, the operating conditions are at least any one of the injection amount of the fuel to be injected to a cylinder 21 of the engine 2, and the combustion timing at which the fuel is combusted.

The engine control apparatus 1 includes a storage section 11 and a control section 12. The storage section 11 is a storage medium including a ROM (Read Only Memory), a RAM (Random Access Memory), a hard disk, and the like. The storage section 11 stores programs to be executed by the control section 12.

Figure 2:
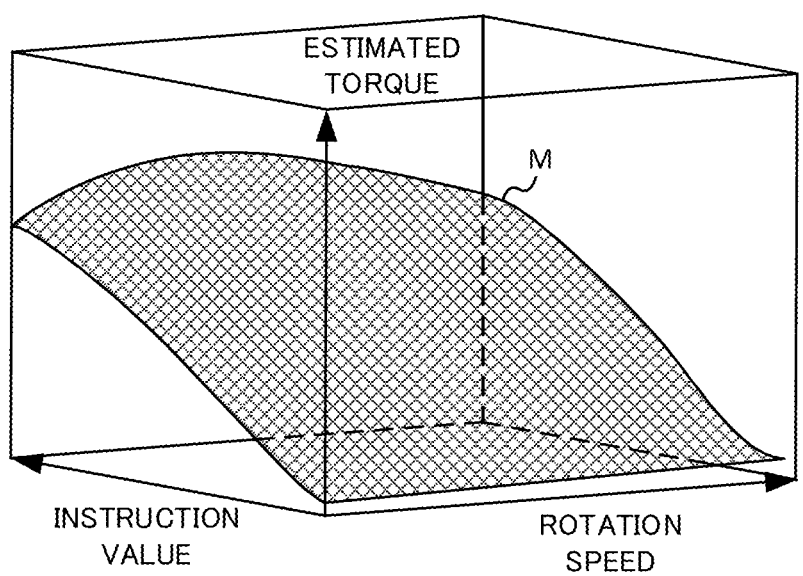
FIG. 2 is a figure schematically depicting a control map representing the relationship among an instruction value, a rotation speed, and an estimated torque.

The storage section 11 stores information representing the relationship among an instruction value representing the injection amount of the fuel, the rotation speed of the engine 2 (hereinafter, called the rotation speed), and an estimated torque. For example, the instruction value is the magnitude of a voltage or current applied to the injecting section 22 for injection time during which a valve of an injecting section 22 is opened. For example, the information representing the relationship among the instruction value, the rotation speed, and the estimated torque is a control map represented by a curved surface in a three-dimensional space having axes representing the instruction value, the rotation speed, and the estimated torque. FIG. 2 is a figure schematically depicting a control map M depicting the relationship among the instruction value, the rotation speed, and the estimated torque.

The storage section 11 stores the control map M. The storage section 11 may store a data table as the information representing the relationship among the instruction value, the rotation speed, and the estimated torque. In addition, as the information representing the relationship among the instruction value, the rotation speed, and the estimated torque, the storage section 11 may store a function that outputs the estimated torque using the instruction value and the rotation speed as inputs.

For example, the control section 12 is a computational resource including a processor such as a CPU (Central Processing Unit). The control section 12 realizes functions as a first acquiring section 121, a second acquiring section 122, a correcting section 123, and an injection control section 124 by executing a program stored on the storage section 11.

The first acquiring section 121 acquires the estimated torque of the engine 2 according to the current rotation speed of the engine 2, and the instruction value. Specifically, first, the first acquiring section 121 acquires, from the injection control section 124, the instruction value to be given when the injection control section 124 that causes the injecting section 22 to inject the fuel causes the injecting section 22 to inject the fuel. Subsequently, the first acquiring section 121 acquires, from a rotation speed sensor 31, the current rotation speed of the output shaft 3 of the engine 2 sensed by the rotation speed sensor 31 when the injection control section 124 causes the injecting section 22 to inject an amount of the fuel according to the instruction value. Then, the first acquiring section 121 acquires, from the control map M, the estimated torque according to the rotation speed acquired from the rotation speed sensor 31, and the instruction value acquired from the injection control section 124. In addition, the first acquiring section 121 may acquire the estimated torque by inputting the instruction value and the rotation speed to the function that outputs the estimated torque using the instruction value and the rotation speed as inputs.

The second acquiring section 122 acquires the amount of generated power generated by the electric power generator 4 when the amount of the fuel according to the instruction value is injected to the cylinder 21. For example, the second acquiring section 122 acquires the value of a current that flowed through the electric power generator 4 when the amount of the fuel according to the instruction value was injected to the cylinder 21, and the value of a voltage that was applied when the current flowed, and acquires the amount of the generated power according to the acquired current value and voltage value. Specifically, the second acquiring section 122 acquires the product of the current value and the voltage value as the amount of the generated power.

The second acquiring section 122 acquires the actual torque according to the amount of the generated power. Specifically, from information representing the relationship between the amount of the generated power and the actual torque, the second acquiring section 122 acquires the actual torque according to the amount of the generated power. The information representing the relationship between the amount of the generated power and the actual torque is stored on the storage section 11. For example, the information representing the relationship between the amount of the generated power and the actual torque is a function that outputs the actual torque using the amount of the generated power as an input, but may be a data table in which the amount of the generated power and the actual torque are associated with each other.

The second acquiring section 122 acquires the actual torque in a case where the engine 2 is refueled. For example, the second acquiring section 122 acquires the actual torque in a case where the amount of the fuel stored in a fuel tank immediately after the engine 2 is started is greater than the amount of the fuel that had been stored in the fuel tank immediately before the engine 2 was stopped. Specifically, in a case where, on the basis of sensing values of a sensor that is provided at the fuel tank, and senses the amount of the fuel, the amount of the fuel represented by a sensing value of the sensor, and sensed immediately after the engine 2 is started is greater than the amount of the fuel represented by a sensing value of the sensor, and sensed immediately before the engine 2 was stopped, the second acquiring section 122 acquires the actual torque.

The second acquiring section 122 may accept, from an ECU (Electronic Control Unit) mounted on the vehicle V, information that the engine 2 was refueled. In this case, in a case where the amount of the fuel immediately after the engine 2 is started is greater than the amount of the fuel immediately before the engine 2 was stopped, the ECU notifies the second acquiring section 122 of the information that the engine 2 was refueled. The second acquiring section 122 acquires the actual torque in a case where the second acquiring section 122 accepted the information that the engine 2 was refueled.

In a case where the engine 2 has not been refueled, the second acquiring section 122 does not acquire the actual torque. Specifically, if the amount of the fuel that had been stored in the fuel tank immediately before the engine 2 was stopped is equal to or greater than the amount of the fuel stored in the fuel tank immediately after the engine 2 was started, the second acquiring section 122 does not acquire the actual torque. In addition, in a case where the second acquiring section 122 has not accepted, from the ECU, the information that the engine 2 was refueled or in a case where the second acquiring section 122 accepted, from the ECU, information that the engine 2 has not been refueled, the second acquiring section 122 does not acquire the actual torque. Thereby, the second acquiring section 122 can avoid execution of processes that need not be executed.

The second acquiring section 122 acquires the actual torque while the vehicle V is traveling with the motor 6 after the vehicle V is refueled. Specifically, the second acquiring section 122 causes the clutch 5 to disconnect transmission of motive power between the electric power generator 4 and the motor 6, and acquires the actual torque while the vehicle V is travelling only with drive force of the motor 6. The injection control section 124 causes the injecting section 22 to inject the fuel in accordance with a predetermined instruction value when the second acquiring section 122 acquires the actual torque.

In a case where a first torque difference between the estimated torque and the actual torque is equal to or greater than a predetermined value, it is considered that the engine 2 was refueled with a type of fuel different from a type of fuel that had been stored immediately before the stop. In view of this, on the basis of the first torque difference between the estimated torque and the actual torque, the correcting section 123 corrects at least any one of combustion timing at which the fuel is combusted in the cylinder 21 and an instruction value. For example, in a case where the first torque difference is equal to or greater than the predetermined value, the correcting section 123 corrects at least any one of the combustion timing and the instruction value. For example, the predetermined value is set in accordance with a difference between the estimated torque and the actual torque which difference is tolerated as an error that can be caused by sensing errors of a voltage and a current acquired by the second acquiring section 122. The predetermined value is greater than the tolerated error. It is sufficient if a specific value of the predetermined value is set as appropriate by conducting experiments or the like. Thereby, the correcting section 123 can correct the combustion timing and the instruction value in a case where there is a significant difference between the actual torque and the estimated torque due to refueling with a type of fuel different from a type of fuel that had been stored immediately before the engine 2 was stopped, for example.

Note that the correcting section 123 does not correct the combustion timing and the instruction value in a case where the first torque difference is smaller than the predetermined value. Thereby, the correcting section 123 can avoid undesirably correcting the combustion timing and the instruction value in a case where the first torque difference is small, and it is not necessary to correct the combustion timing and the instruction value.

The correcting section 123 corrects the combustion timing first in a case where the first torque difference is equal to or greater than the predetermined value. The combustion timing is injection timing of the fuel in a case where the engine 2 is a diesel engine, and is ignition timing in a case where the engine 2 is a gasoline engine. The correcting section 123 corrects the combustion timing by an amount of time that is increased as the first torque difference increases. Specifically, the correcting section 123 expedites the combustion timing by an amount of time that is increased as the first torque difference increases such that the fuel is combusted at the corrected combustion timing. The correcting section 123 notifies the injection control section 124 of the expedited combustion timing. Thereby, it becomes possible for the correcting section 123 to cause the engine 2 to output an appropriate torque without changing the amount of the injected fuel, and accordingly the fuel consumption of the vehicle V can be enhanced.

Note that the correcting section 123 may delay the combustion timing in a case where the first torque difference does not become 0 even if the combustion timing is expedited. For example, the correcting section 123 delays the combustion timing in a case where the absolute value of the first torque difference acquired after the combustion timing is expedited is not 0. Specifically, the correcting section 123 delays the combustion timing by an amount of time that is increased as the first torque difference increases in a case where the absolute value of the first torque difference acquired after the combustion timing is expedited is equal to or greater than a first threshold which is smaller than the predetermined value and greater than 0. The correcting section 123 notifies the injection control section 124 of the expedited combustion timing in a case where the absolute value of the first torque difference is smaller than the first threshold. It is sufficient if the first threshold is set as appropriate by a business operator who manufactures the engine control apparatus 1 as a tolerable value of the difference between the estimated torque and the actual torque.

Whereas the correcting section 123 expedites the combustion timing, and then delays the combustion timing, this is not the sole example, but the correcting section 123 may delay the combustion timing, and then expedite the combustion timing. In this case, the correcting section 123 delays the combustion timing, and assesses whether or not the absolute value of the first torque difference after the combustion timing is delayed is equal to or greater than the first threshold. The correcting section 123 notifies the injection control section 124 of the delayed combustion timing in a case where the absolute value of the first torque difference is smaller than the first threshold. The correcting section 123 expedites the combustion timing by an amount of time that is increased as the first torque difference increases in a case where the absolute value of the first torque difference is equal to or greater than the first threshold.

The correcting section 123 corrects the instruction value in a case where the first torque difference is equal to or greater than the predetermined value even if the combustion timing is corrected. Specifically, the correcting section 123 corrects the instruction value in a case where a second torque difference between the estimated torque and the corrected actual torque acquired when the fuel is combusted at the corrected combustion timing is equal to or greater than the predetermined value. More specifically, the correcting section 123 increases the instruction value as the second torque difference increases in a case where the second torque difference is equal to or greater than the predetermined value. The correcting section 123 does not correct the instruction value in a case where the second torque difference is smaller than the predetermined value.

The correcting section 123 may correct the instruction value without correcting the combustion timing in a case where the first torque difference is equal to or greater than an assessment value which is greater than the predetermined value. The assessment value is greater than such a value that the first torque difference can be made 0 by correction of the combustion timing. The correcting section 123 increases the instruction value as the first torque difference increases in a case where the first torque difference is equal to or greater than the assessment value. Thereby, the correcting section 123 can correct the instruction value without correcting the combustion timing in a case where the first torque difference cannot be made 0 even if the combustion timing is corrected. Accordingly, the length of time necessary for the correction process can be shortened.

First Modification Example

The engine control apparatus 1 according to the embodiment described above corrects both the instruction value and the combustion timing. This is not the sole example, but the engine control apparatus 1 may correct only the combustion timing. In this case, the engine control apparatus 1 corrects the combustion timing in a case where the first torque difference is equal to or greater than the predetermined value, and does not correct the combustion timing in a case where the first torque difference is smaller than the predetermined value.

Second Modification Example

The engine control apparatus 1 may correct only the instruction value instead of the combustion timing. In this case, the engine control apparatus 1 corrects the instruction value in a case where the first torque difference is equal to or greater than the predetermined value, and does not correct the instruction value in a case where the first torque difference is smaller than the predetermined value.

[Process of Correcting Combustion Timing and Instruction Value]

Figure 3:
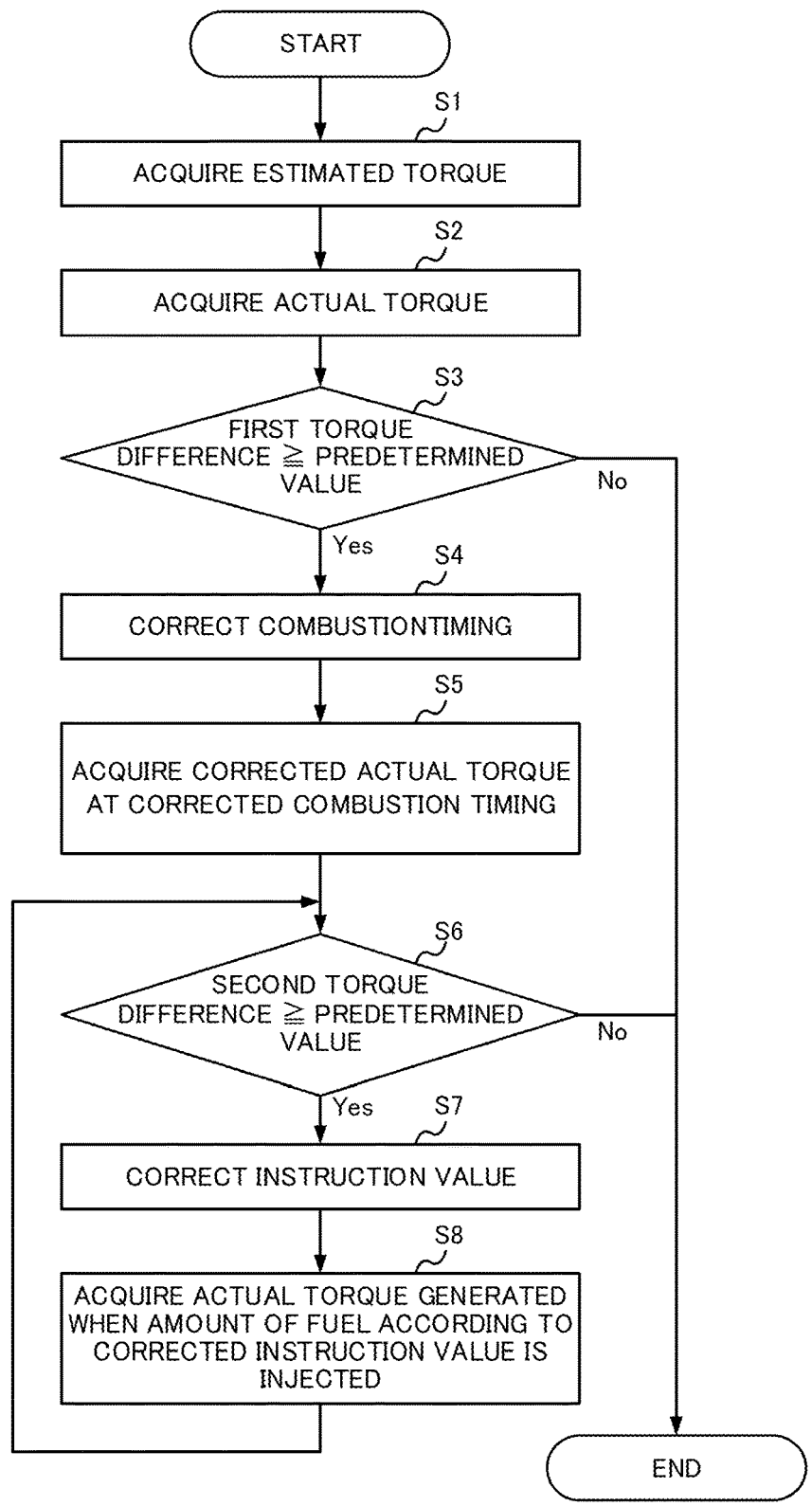
FIG. 3 is a flowchart depicting an example of the procedure of a process executed by an engine control apparatus 1 to correct combustion timing and an instruction value.

FIG. 3 is a flowchart depicting an example of the procedure of a process executed by the engine control apparatus 1 to correct the combustion timing and the instruction value. The flowchart in FIG. 3 is executed in a case where the engine 2 is refueled. In a case where the flowchart in FIG. 3 is executed, the engine control apparatus 1 disconnects the clutch 5, and disconnects transmission of motive power between the electric power generator 4 and the motor 6.

The first acquiring section 121 acquires the estimated torque of the engine 2 (Step S1). Specifically, the first acquiring section 121 acquires the estimated torque according to the rotation speed of the output shaft 3 of the engine 2, and the instruction value that is given when the injection control section 124 causes the fuel to be injected. More specifically, the first acquiring section 121 acquires the estimated torque corresponding to the acquired rotation speed and instruction value from the control map M representing the relationship among the instruction value, the rotation speed, and the estimated torque.

The second acquiring section 122 acquires the actual torque of the engine 2 acquired when an amount of the fuel according to the instruction value is injected to the cylinder 21 of the engine 2 (Step S2). Specifically, from information representing the relationship between the amount of the generated power of the electric power generator 4 and the actual torque, the second acquiring section 122 acquires the actual torque according to the amount of the generated power generated by the electric power generator 4 when the amount of the fuel according to the instruction value is injected to the cylinder 21.

The correcting section 123 assesses whether or not the first torque difference between the estimated torque and the actual torque is equal to or greater than the predetermined value (Step S3). Specifically, the correcting section 123 assesses whether or not the absolute value of the first torque difference is equal to or greater than the predetermined value. In a case where the absolute value of the first torque difference is smaller than the predetermined value (No at Step S3), the correcting section 123 ends the process of correcting the combustion timing and the instruction value.

In a case where the absolute value of the first torque difference is equal to or greater than the predetermined value (Yes at Step S3), the correcting section 123 corrects the combustion timing (Step S4). Specifically, the correcting section 123 expedites or delays the combustion timing by an amount of time that is increased as the first torque difference increases.

The second acquiring section 122 acquires the corrected actual torque acquired when the fuel is combusted at the corrected combustion timing (Step S5). Then, the correcting section 123 assesses whether or not the second torque difference between the corrected actual torque and the estimated torque is equal to or greater than the predetermined value (Step S6).

In a case where the second torque difference is equal to or greater than the predetermined value (Yes at Step S6), the correcting section 123 corrects the instruction value (Step S7). The second acquiring section 122 acquires the actual torque generated when the amount of the fuel according to the corrected instruction value is injected (Step S8). The second acquiring section 122 and the correcting section 123 repeat Step S6 to Step S8 until the second torque difference becomes smaller than the predetermined value. In a case where the second torque difference is smaller than the predetermined value (No at Step S6), the correcting section 123 ends the process of correcting the combustion timing and the instruction value.

Note that the correcting section 123 may return to Step S3 after Step S8, and repeat Step S3 to Step S8. In addition, after assessing that the first torque difference is equal to or greater than the predetermined value at Step S3, the correcting section 123 may assess whether or not the first torque difference is equal to or greater than the assessment value which is greater than the predetermined value. In this case, the correcting section 123 corrects the instruction value in a case where the first torque difference is equal to or greater than the assessment value, and corrects the combustion timing in a case where the first torque difference is smaller than the assessment value.

Modification Example

Whereas the vehicle V has the electric power generator 4 and the motor 6 mounted thereon in the embodiment described above, this is not the sole example, and the vehicle V may have only the electric power generator 4 mounted thereon. In this case, it becomes not possible for the vehicle V to travel during executing the process of correcting the combustion timing and the instruction value, but since the vehicle V does not have the motor 6 mounted thereon, the business operator who manufactures the vehicle V can reduce the size and price of the vehicle V.

[Effects of Engine Control Apparatus 1]

As explained above, the engine control apparatus 1 according to the present disclosure makes it possible to set appropriate combustion timing and an instruction value even if the engine 2 is supplied with a different type of fuel, or a plurality of mutually different types of fuel are mixed, and the cetane number (or octane number) of the fuel changes. In other words, the engine control apparatus 1 makes it possible to appropriately set operating condition of the engine 2 that can be refueled with various types of fuel. Furthermore, since it becomes unnecessary for a user who uses the engine 2 to set the type of the fuel supplied for the engine 2, the convenience for the user can be enhanced. In addition, since it becomes unnecessary for the business operator who manufactures the vehicle on which the engine control apparatus 1 is mounted to examine whether different types of fuel can be used, it becomes possible to reduce the cost related to the development of vehicles.

Whereas the present disclosure has been explained thus far by using embodiments, the technical scope of the present disclosure is not limited by the scope of the description of the embodiments described above, but can be modified and changed variously within the scope of the gist. For example, all or some of devices can be configured in a functionally or physically distributed/integrated manner in any units. In addition, embodiments of the present disclosure include also new embodiments that are generated by combining any ones of a plurality of embodiments. Effects of the new embodiments generated by the combination combine effects of the original embodiments.

What is claimed is:

1. An engine control apparatus comprising:
   a first acquiring section that acquires an estimated torque of an engine according to a rotation speed of the engine, and an instruction value representing an injection amount of a fuel injected to a cylinder of the engine;
   a second acquiring section that acquires an actual torque according to an amount of generated power generated by an electric power generator coupled to an output shaft of the engine when the amount of the fuel according to the instruction value is injected to the cylinder of the engine; and a correcting section that corrects combustion timing at which the fuel is combusted in the cylinder on a basis of a first torque difference between the estimated torque and the actual torque, wherein the second acquiring section:

acquires the actual torque in a case where the amount of the fuel stored in a fuel tank immediately after the engine is started is greater than the amount of the fuel that had been stored in the fuel tank immediately before the engine was stopped; and does not acquire the actual torque when the amount of the fuel that had been stored in the fuel tank immediately before the engine was stopped is equal to or greater than the amount of the fuel stored in the fuel tank immediately after the engine was started.

2. The engine control apparatus according to claim 1, wherein the correcting section does not correct the combustion timing in a case where the first torque difference is smaller than a predetermined value which is greater than a difference between the estimated torque and the actual torque which difference is tolerated as an error caused by a sensing error of the amount of the generated power, and corrects the combustion timing in a case where the first torque difference is equal to or greater than the predetermined value.

3. The engine control apparatus according to claim 2, wherein the correcting section corrects the instruction value in a case where a second torque difference between the estimated torque and the actual torque acquired when the fuel is combusted at the corrected combustion timing is equal to or greater than the predetermined value, and does not correct the instruction value in a case where the second torque difference is smaller than the predetermined value.

4. The engine control apparatus according to claim 2, wherein the correcting section expedites or delays the combustion timing by an amount of time that is increased as a difference of the first torque difference from the predetermined value increases in a case where the first torque difference is equal to or greater than the predetermined value.

5. The engine control apparatus according to claim 4, wherein the first acquiring section acquires the estimated torque after the correcting section expedites or delays the combustion timing by the increased amount of time, the second acquiring section acquires the actual torque after the correcting section expedites or delays the combustion timing by the increased amount of time, and the correcting section delays the combustion timing by an amount of time that is increased as the first torque difference between the estimated torque and the actual torque after the correcting section expedites the combustion timing by the increased amount of time increases in a case where an absolute value of the first torque difference is equal to or greater than a first threshold which is smaller than the predetermined value and greater than 0, and expedites the combustion timing by an amount of time that is increased as the first torque difference between the estimated torque and the actual torque after the correcting section delays the combustion timing by the increased amount of time increases in a case where the absolute value of the first torque difference is equal to or greater than the first threshold.

6. An engine control apparatus comprising:

a first acquiring section that acquires an estimated torque of an engine according to a rotation speed of the engine, and an instruction value representing an injection amount of a fuel injected to a cylinder of the engine;

a second acquiring section that acquires an actual torque according to an amount of generated power generated by an electric power generator coupled to an output shaft of the engine when the amount of the fuel according to the instruction value is injected to the cylinder of the engine; and a correcting section that corrects the instruction value on a basis of a first torque difference between the estimated torque and the actual torque, the second acquiring section:

acquires the actual torque in a case where the amount of the fuel stored in a fuel tank immediately after the engine is started is greater than the amount of the fuel that had been stored in the fuel tank immediately before the engine was stopped; and does not acquire the actual torque when the amount of the fuel that had been stored in the fuel tank immediately before the engine was stopped is equal to or greater than the amount of the fuel stored in the fuel tank immediately after the engine was started.

7. The engine control apparatus according to claim 1, wherein the second acquiring section acquires the actual torque while [the] a vehicle is traveling with a motor that is mounted on the vehicle including the engine, and different from the electric power generator.

8. The engine control apparatus according to claim 6, wherein the correcting section increases the instruction value as the first torque difference increases.

9. The engine control apparatus according to claim 1, wherein, from information representing a relationship among the rotation speed of the engine, the instruction value, and the estimated torque, the first acquiring section acquires the estimated torque according to a current rotation speed of the engine and the instruction value.

10. The engine control apparatus according to claim 1, wherein, from information representing a relationship between the amount of the generated power of the electric power generator and the actual torque, the second acquiring section acquires the actual torque according to the amount of the generated power of the electric power generator when the fuel is injected to the cylinder in accordance with the instruction value.

* * * * *